United States Patent
Ju et al.

(10) Patent No.: US 12,072,218 B1
(45) Date of Patent: Aug. 27, 2024

(54) PHASE QUADRATURE FOUR-WAVELENGTH DEMODULATION SYSTEM AND METHOD OF OPTICAL FIBER F-P CAVITY SENSOR

(71) Applicant: STATE GRID JIANGSU TAIZHOU POWER SUPPLY COMPANY, Taizhou (CN)

(72) Inventors: Ling Ju, Taizhou (CN); Beibei Weng, Taizhou (CN); Yanquan Zhu, Taizhou (CN); Xingchun Xu, Taizhou (CN); Xiaoyun Liao, Taizhou (CN); Lijian Ouyang, Taizhou (CN); Jun Xu, Taizhou (CN); Li Liu, Taizhou (CN); Yi Huang, Taizhou (CN); Chuanlu Deng, Taizhou (CN); Chengyong Hu, Taizhou (CN)

(73) Assignee: State Grid Jiangsu Taizhou Power Supply Company, Taizhou (CN)

( * ) Notice: Subject to any disclaimer, the term of this patent is extended or adjusted under 35 U.S.C. 154(b) by 0 days.

(21) Appl. No.: 18/565,314

(22) PCT Filed: Oct. 27, 2023

(86) PCT No.: PCT/CN2023/127004
§ 371 (c)(1),
(2) Date: Nov. 29, 2023

(51) Int. Cl.
*G01D 5/353* (2006.01)
*H04J 14/02* (2006.01)

(52) U.S. Cl.
CPC .......... *G01D 5/353* (2013.01); *H04J 14/0215* (2013.01)

(58) Field of Classification Search
CPC ............... G01D 5/353; G01D 5/35316; G01D 5/35383; H04J 14/0215; G02B 6/022; G02B 6/0208; G02B 6/02042
See application file for complete search history.

(56) References Cited

U.S. PATENT DOCUMENTS 7,324,714 B1 * 1/2008 Cranch .................. G01B 11/18
250/227.16

FOREIGN PATENT DOCUMENTS

CN 103697922 A 4/2014
CN 203642944 U 6/2014
(Continued)

OTHER PUBLICATIONS

International Search Report and Written Opinion for Application No. PCT/CN2023/127004, dated Jan. 29, 2024 (Jan. 29, 2024)—12 pages (English translation, 12 pages).

(Continued)

*Primary Examiner* — Michael P Mooney
(74) *Attorney, Agent, or Firm* — Culhane PLLC; Stephen J. Weed

(57) ABSTRACT

Provided are a phase quadrature four-wavelength demodulation system and method of an optical fiber F-P cavity sensor. The phase quadrature four-wavelength demodulation system of the optical fiber F-P cavity sensor includes a flat ASE broadband light source, an optical fiber circulator, a dense wavelength division multiplexer, a photoelectric detector, and a data acquisition processing unit. The flat ASE broadband light source is connected to the optical fiber circulator, the optical fiber circulator is connected to the dense wavelength division multiplexer, the dense wavelength division multiplexer is connected to the photoelectric detector, and the photoelectric detector is connected to the data acquisition processing unit.

12 Claims, 1 Drawing Sheet

(56) References Cited

FOREIGN PATENT DOCUMENTS

| | | |
|---|---|---|
| CN | 109520532 A | 3/2019 |
| CN | 113295257 A | 8/2021 |
| CN | 113494955 A | 10/2021 |
| CN | 116086507 A | 5/2023 |
| FR | 3057678 A1 | 4/2018 |

OTHER PUBLICATIONS

Zhang, Wanjin, "Four-Wavelength Quadrature Phase Demodulation Technique for Extrinsic Fabry-Perot Interferometric Sensors," Optics Letters, vol. 47, No. 10, May 15, 2022 (May 15, 2022, pp. 2406-2409.

Zhang, Wanjin, "Research on Phase Demodulation Technology of Optical Fiber Interferometric Acoustic Sensor," China doctoral dissertation database (information technology), May 1, 2022 (May 1, 2022), pp. 85-98, FIGS. 2.1-5.11.

\* cited by examiner

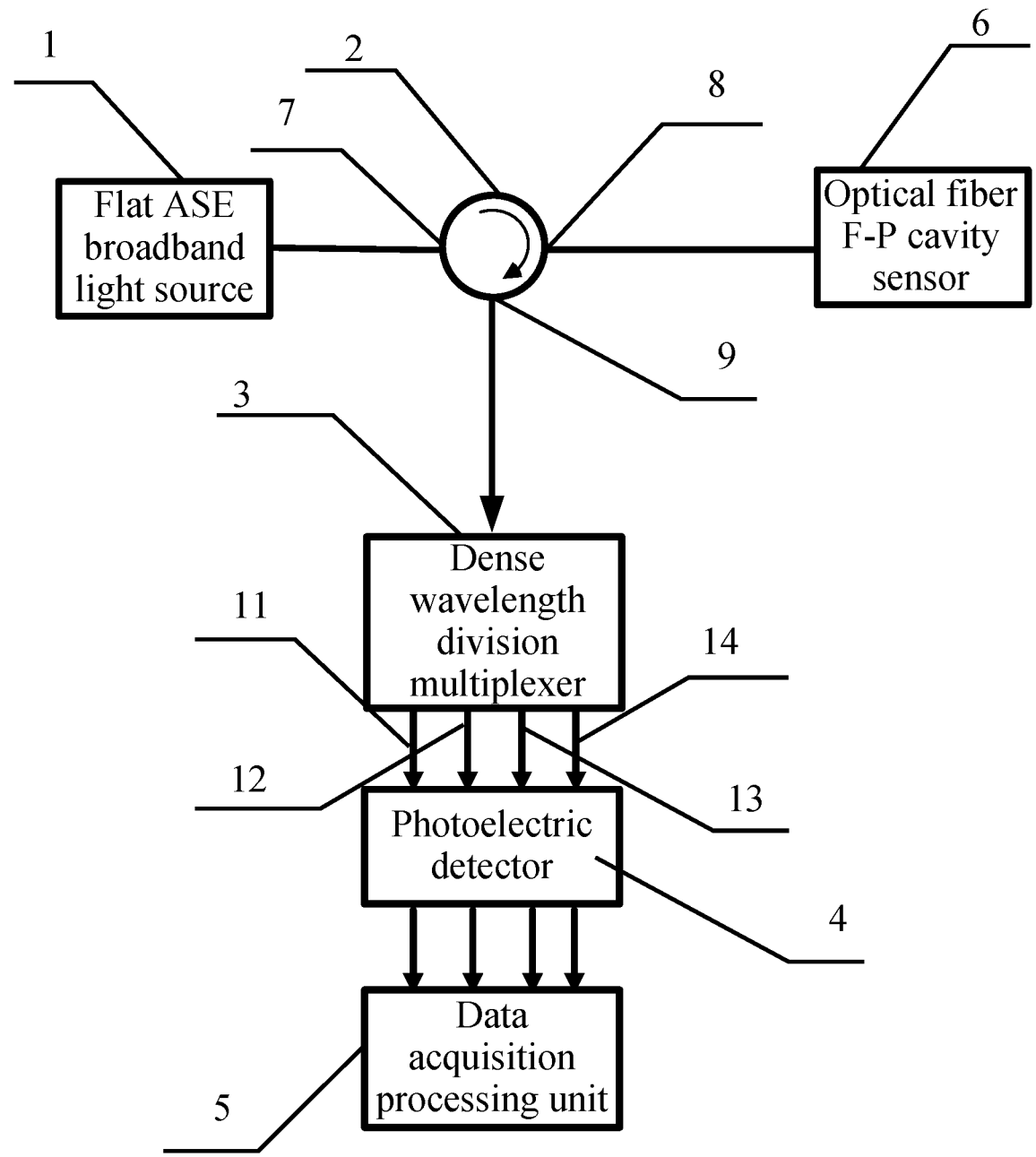

PHASE QUADRATURE FOUR-WAVELENGTH DEMODULATION SYSTEM AND METHOD OF OPTICAL FIBER F-P CAVITY SENSOR

CROSS-REFERENCE TO RELATED APPLICATIONS

This is a National Stage Application, filed under 35 U.S.C. 371, of International Patent Application No. PCT/CN2023/127004, filed on Oct. 27, 2023, which claims priority to Chinese Patent Application No. 202211626974.1, filed with the China National Intellectual Property Administration (CNIPA) on Dec. 16, 2022, the disclosures of which are incorporated herein by reference in their entireties.

TECHNICAL FIELD

The present application relates to the field of optical fiber sensing technologies, for example, to a phase quadrature four-wavelength demodulation system and method of an optical fiber F-P cavity sensor.

BACKGROUND

The optical fiber F-P cavity sensor has attracted wide attention in the fields of medical detection, structural state detection, photoacoustic imaging, power cable monitoring, and the like with the advantages of high sensitivity, strong anti-interference capability, and the like. The demodulation method is a main factor in restricting the detection capability of the optical fiber F-P cavity sensor.

The demodulation of signals of the optical fiber F-P sensor mainly includes intensity demodulation and phase demodulation. The intensity demodulation includes single-wavelength demodulation, dual-wavelength demodulation, and three-wavelength demodulation. The single-wavelength demodulation method is greatly influenced by the stability of the light source, the dual-wavelength demodulation method is easy to generate an orthogonal phase drift, and the three-wavelength demodulation method generally adopts three laser light sources and has a complex structure and higher cost. The spectrum output by the phase demodulation method is the superposition of all wavelength information, so the phase demodulation method has obvious advantages in the demodulation precision, resolution and stability, but the system cost is high, the measurement speed is slow, and it is inadequate in real-time demodulation of dynamic variables.

SUMMARY

The present application provides a phase quadrature four-wavelength demodulation system and method of an optical fiber F-P cavity sensor.

The present application provides a phase quadrature four-wavelength demodulation system of an optical fiber F-P cavity sensor. The phase quadrature four-wavelength demodulation system includes a flat amplified spontaneous emission (ASE) broadband light source, an optical fiber circulator, a dense wavelength division multiplexer, a photoelectric detector, and a data acquisition processing unit. The flat ASE broadband light source is connected to the optical fiber circulator, the optical fiber circulator is connected to the dense wavelength division multiplexer, the dense wavelength division multiplexer is connected to the photoelectric detector, and the photoelectric detector is connected to the data acquisition processing unit. The optical fiber circulator is configured to transmit an optical signal, where the optical signal from the flat ASE broadband light source enters the optical fiber F-P cavity sensor via the optical fiber circulator; the optical fiber F-P cavity sensor is configured to generate reflected light, where the reflected light generated by the optical fiber F-P cavity sensor is input to the dense wavelength division multiplexer via the optical fiber circulator; the dense wavelength division multiplexer is configured to decompose the received reflected light into four beams of narrowband light of different wavelengths and input the four beams of narrowband light of different wavelengths to the photoelectric detector; the photoelectric detector is configured to perform a photoelectric conversion on the four beams of narrowband light of different wavelengths and input the photoelectrically converted four beams of narrowband light of different wavelengths to the data acquisition processing unit; and the data acquisition processing unit is configured to demodulate the photoelectrically converted four beams of narrowband light of different wavelengths to obtain a cavity length change amount of the optical fiber F-P cavity sensor so that a change of to-be-measured external environment is reflected according to the cavity length change amount.

In an embodiment of the present application, a formula of the cavity length change amount of the optical fiber F-P cavity sensor is as follows:

$$\begin{cases} \phi_i = \tan^{-1}\left[\dfrac{I_4 - I_2}{I_1 - I_3}\right] \pm m\pi \\ L_d = \dfrac{\lambda_i \phi_i}{4n\pi} \\ L_d = L + \Delta L \end{cases},$$

where i=1, 2, 3, 4; $\phi_i$ is a phase corresponding to an $i^{th}$ narrowband optical wavelength; $\lambda_i$ is the $i^{th}$ narrowband optical wavelength; $I_1$, $I_2$, $I_3$, and $I_4$ are light intensities corresponding to wavelengths of the four beams of narrowband light of different wavelengths, respectively; m is an integer; n is a refractive index of air in a cavity of the optical fiber F-P cavity sensor; $L_d$ is a real-time cavity length of the optical fiber F-P cavity sensor, L represents an initial cavity length of the optical fiber F-P cavity sensor; and $\Delta L$ is the cavity length change amount of the optical fiber F-P cavity sensor.

In an embodiment of the present application, the flat ASE broadband light source is configured to be an amplified spontaneous emission light source using a C-band optical fiber.

In an embodiment of the present application, the photoelectric detector is a direct current coupled photoelectric detector having an optical fiber input interface.

In an embodiment of the present application, four paths of voltage output by the photoelectric detector after the photoelectric detector performs the photoelectric conversion on the four beams of narrowband light of different wavelengths have the same amplitude.

The present application provides a phase quadrature four-wavelength demodulation method of an optical fiber F-P cavity sensor, where a change in an external to-be-measured environment is detected by using the preceding phase quadrature four-wavelength demodulation system of an optical fiber F-P cavity sensor, and the method includes the following:

An interference spectrum of the optical fiber F-P cavity sensor is acquired; an initial cavity length L of the optical fiber F-P cavity sensor is calculated according to the interference spectrum; in a case where a light source enters the optical fiber F-P cavity sensor and the optical fiber F-P cavity sensor generates reflected light, the reflected light is decomposed into four beams of narrowband light, and a photoelectric conversion is performed on the four beams of narrowband light to determine wavelengths of photoelectrically converted four beams of narrowband light; phases corresponding to wavelengths of the four beams of narrowband light are calculated according to the initial cavity length L of the optical fiber F-P cavity sensor and the wavelengths of the photoelectrically converted four beams of narrowband light; light intensities corresponding to the wavelengths of the four beams of narrowband light are calculated according to the phases corresponding to the wavelengths of the four beams of narrowband light; and the cavity length change amount of the optical fiber F-P cavity sensor is calculated according to the light intensities corresponding to the wavelengths of the four beams of narrowband light.

In an embodiment of the present application, a formula for calculating the initial cavity length L of the optical fiber F-P cavity sensor according to the interference spectrum is as follows:

$$\frac{4n\pi L}{\lambda_x} - \frac{4n\pi L}{\lambda_y} = 2\pi$$

where n is a refractive index of air in a cavity of the optical fiber F-P cavity sensor; L is the initial cavity length of the optical fiber F-P cavity sensor; and $\lambda_x$ and $\lambda_y$ are center wavelengths corresponding to adjacent peaks in the interference spectrum of the optical fiber F-P cavity sensor.

In an embodiment of the present application, a formula for determining the wavelengths of the photoelectrically converted four beams of narrowband light is as follows:

$$\begin{cases} \phi_1 - \phi_2 = \phi_2 - \phi_3 = \phi_3 - \phi_4 = \dfrac{\pi}{2} + k\pi \\ \Delta\lambda = \lambda_2 - \lambda_1 = \lambda_3 - \lambda_2 = \lambda_4 - \lambda_3 \approx \dfrac{\lambda_2^2}{8nL}(2k+1) \end{cases},$$

where k is an integer; $\lambda_1$, $\lambda_2$, $\lambda_3$ and $\lambda_4$ are the wavelengths of the four beams of narrowband light of different wavelengths, respectively; $\phi_1$, $\phi_2$, $\phi_3$ and $\phi_4$ are the phases corresponding to the wavelengths of the four beams of narrowband light of different wavelengths; L represents the initial cavity length of the optical fiber F-P cavity sensor; n is a refractive index of air in a cavity of the optical fiber F-P cavity sensor; and $\Delta\lambda$ is a difference between wavelengths of adjacent narrowband light.

In an embodiment of the present application, a formula for calculating the light intensities corresponding to the wavelengths of the four beams of narrowband light according to the phases corresponding to the wavelengths of the four beams of narrowband light is as follows:

$$\begin{cases} I_i = A + B\cos(\phi_i + \phi_0) \\ \phi_i = \dfrac{4n\pi}{\lambda_i}L \end{cases},$$

where i=1, 2, 3, 4; $I_i$ is a light intensity corresponding to an $i^{th}$ narrowband light wavelength; A is a direct current component of the interference spectrum; B is a contrast of the interference spectrum; $\phi_i$ is a phase corresponding to the $i^{th}$ narrowband light wavelength; $\phi_0$ is an initial phase corresponding to the $i^{th}$ narrowband light wavelength; n is a refractive index of air in a cavity of the optical fiber F-P cavity sensor; L is an initial cavity length of the optical fiber F-P cavity sensor; and $\lambda_i$ is the $i^{th}$ narrowband light wavelength.

In an embodiment of the present application, a formula for calculating the cavity length change amount of the optical fiber F-P cavity sensor according to the light intensities corresponding to the wavelengths of the four beams of narrowband light is as follows:

$$\begin{cases} \phi_i = \tan^{-1}\left[\dfrac{I_4 - I_2}{I_1 - I_3}\right] \pm m\pi \\ L_d = \dfrac{\lambda_i \phi_i}{4n\pi} \\ L_d = L + \Delta L \end{cases},$$

where i=1, 2, 3, 4; $\phi_i$ is a phase corresponding to an $i^{th}$ narrowband optical wavelength; $\lambda_i$ is the $i^{th}$ narrowband optical wavelength; $I_1$, $I_2$, $I_3$, and $I_4$ are the light intensities corresponding to the wavelengths of the four beams of narrowband light of different wavelengths; m is an integer; n is a refractive index of air in a cavity of the optical fiber F-P cavity sensor; $L_d$ is a real-time cavity length of the optical fiber F-P cavity sensor; L represents the initial cavity length of the optical fiber F-P cavity sensor; and $\Delta L$ is the cavity length change amount of the optical fiber F-P cavity sensor.

BRIEF DESCRIPTION OF DRAWINGS

FIG. 1 is a diagram illustrating the structure principle according to an embodiment of the present application.

REFERENCE LIST 1 flat ASE broadband light source
2 optical fiber circulator
3 dense wavelength division multiplexer
4 photoelectric detector
5 data acquisition processing unit
6 optical fiber F-P cavity sensor
7 first port
8 second port
9 third port
11 first output port
12 second output port
13 third output port
14 fourth output port

DETAILED DESCRIPTION

Hereinafter, the present application will be described in conjunction with the accompanying drawings and specific embodiments so that those skilled in the art may understand and practice the present application.

Embodiment One

Referring to FIG. 1, a phase quadrature four-wavelength demodulation system of an optical fiber F-P cavity sensor according to the present application includes a flat ASE broadband light source 1, an optical fiber circulator 2, a dense wavelength division multiplexer 3, a photoelectric detector 4, and a data acquisition processing unit 5. The flat ASE broadband light source 1 is connected to the optical fiber circulator 2, the optical fiber circulator 2 is connected to the dense wavelength division multiplexer 3, the dense wavelength division multiplexer 3 is connected to the photoelectric detector 4, and the photoelectric detector 4 is connected to the data acquisition processing unit 5.

An optical signal from the flat ASE broadband light source 1 enters the optical fiber F-P cavity sensor 6 via the optical fiber circulator 2 so that the optical fiber F-P cavity sensor 6 generates reflected light, and the reflected light generated by the optical fiber F-P cavity sensor 6 is input to the dense wavelength division multiplexer 3 via the optical fiber circulator 2. The dense wavelength division multiplexer 3 decomposes the received reflected light into four beams of narrowband light of different wavelengths and inputs the four beams of narrowband light of different wavelengths to the photoelectric detector 4. The photoelectric detector 4 performs a photoelectric conversion on the four beams of narrowband light of different wavelengths and inputs the photoelectrically converted four beams of narrowband light of different wavelengths to the data acquisition processing unit 5. The data acquisition processing unit 5 demodulates the photoelectrically converted four beams of narrowband light of different wavelengths to obtain a cavity length change amount of the optical fiber F-P cavity sensor 6. The cavity length change amount is used to reflect a change of to-be-measured external environment.

In the conventional three-wavelength method, three independent narrowband laser light sources are required, and narrowband optical filters matching the three wavelengths are required, so the cost is high, and it is difficult to achieve accurate control due to the uneven quality of the optical filters. In this embodiment, the flat ASE broadband light source 1 and the dense wavelength division multiplexer 3 are adopted to replace four independent narrowband laser light sources and optical filters, matching of the optical filters is not required, and thus the system cost and technical difficulty are greatly reduced.

This embodiment is described below.

The flat ASE broadband light source 1 is connected to the optical fiber circulator 2 through an optical fiber, the optical fiber circulator 2 is connected to the dense wavelength division multiplexer 3 through an optical fiber, the dense wavelength division multiplexer 3 is connected to the photoelectric detector 4 through an optical fiber, and the photoelectric detector 4 is connected to the data acquisition processing unit 5 through a coaxial cable.

Output light of the flat ASE broadband light source 1 is injected into a first port 7 of the optical fiber circulator 2, and then injected into the optical fiber F-P cavity sensor 6 through a second port 8 of the optical fiber circulator 2. After being injected into the second port 8 of the optical fiber circulator 2 again, the reflected light of the optical fiber F-P cavity sensor 6 is output through a third port 9 of the optical fiber circulator 2 and then injected into an input port of the dense wavelength division multiplexer 3, and the injected broadband reflected light is decomposed into four beams of narrowband light of different wavelengths after being filtered by the dense wavelength division multiplexer 3, The four beams of narrowband light are simultaneously output and injected into the photoelectric detector 4 through four output ports (a first output port 11, a second output port 12, a third output port 13 and a fourth output port 14) of the dense wavelength division multiplexer 3, and after a photoelectric conversion, the four beams of narrowband light are calculated and demodulated by the data acquisition processing unit 5 to obtain the cavity length change amount of the to-be-detected optical fiber F-P cavity sensor 6.

In an embodiment, the flat ASE broadband light source 1 is an amplified spontaneous emission light source using the C-band optical fiber.

In an embodiment, the center wavelength of the optical fiber circulator 2 is 1550 nm.

In an embodiment, the dense wavelength division multiplexer 3 includes one input port and five output ports. A phase difference of the interference spectrum of the center wavelengths of four output ports (i.e., the first output port 11, the second output port 12, the third output port 13, and the fourth output port 14) is $$\frac{\pi}{2} + k\pi$$

(where k is an integer), and the other one output port outputs an unwanted optical signal.

In an embodiment, four paths of voltage output by the photoelectric detector 4 have the same amplitude.

In an embodiment, the data acquisition processing unit 5 includes an analog-to-digital (A/D) acquisition card and a computer, and the A/D acquisition card is connected to the computer via a universal serial bus (USB) interface.

Embodiment Two

This embodiment provides a phase quadrature four-wavelength demodulation method of an optical fiber F-P cavity sensor, a change in the to-be-measured external environment is detected by using the phase quadrature four-wavelength demodulation system of the optical fiber F-P cavity sensor in embodiment one, and the method includes steps described below.

An interference spectrum of the optical fiber F-P cavity sensor 6 is acquired; an initial cavity length of the optical fiber F-P cavity sensor 6 is calculated according to the interference spectrum; in a case where a light source enters the optical fiber F-P cavity sensor 6 and the optical fiber F-P cavity sensor 6 generates reflected light, the reflected light is decomposed into four beams of narrowband light, and a photoelectric conversion is performed on the four beams of narrowband light; wavelengths of the photoelectrically converted four beams of narrowband light is determined according an orthogonal relationship of wavelengths and phases of adjacent narrowband light; phases corresponding to the wavelengths of the four beams of narrowband light are calculated according to the initial cavity length of the optical fiber F-P cavity sensor 6 and the wavelengths of the photoelectrically converted four beams of narrowband light; light intensities corresponding to the wavelengths of the four beams of narrowband light are calculated according to the phases corresponding to the wavelengths of the four beams of narrowband light; and the cavity length change amount of the optical fiber F-P cavity sensor 6 is calculated according to the light intensities corresponding to the wavelengths of the four beams of narrowband light.

In an embodiment, the step in which the wavelengths of the photoelectrically converted four beams of narrowband light are determined according to adjacent narrowband light wavelengths may include determining wavelengths of three remaining photoelectrically converted beams of narrowband light according to the orthogonal relationship of wavelengths and phases of adjacent narrowband light and the wavelength of a selected one path of narrowband light.

The phase quadrature four-wavelength demodulation principle of the optical fiber F-P cavity sensor is described below (that is, the calculation method of the cavity length change amount of the optical fiber F-P cavity sensor 6).

The initial cavity length L is calculated according to the interference spectrum of the optical fiber F-P cavity sensor 6 based on the following formula:

$$\frac{4n\pi L}{\lambda_x} - \frac{4n\pi L}{\lambda_y} = 2\pi,$$

where n is a refractive index of air in the cavity of the optical fiber F-P cavity sensor 6; L is the initial cavity length of the optical fiber F-P cavity sensor 6; and Ax and Ay are center wavelengths corresponding to adjacent peaks in the interference spectrum of the optical fiber F-P cavity sensor 6.

The principle for selecting the wavelength is as follows.

For the optical fiber F-P cavity sensor 6, the light intensities $I_1$, $I_2$, $I_3$, and $I_4$ corresponding to the four wavelengths $\lambda_1$, $\lambda_2$, $\lambda_3$ and $\lambda_4$ satisfy the following formula:

$$\begin{cases} I_i = A + B\cos(\phi_i + \phi_0) \\ \phi_i = \frac{4n\pi}{\lambda_i}L \end{cases},$$

where i=1, 2, 3, 4; $I_i$ is the light intensity corresponding to an $i^{th}$ narrowband light wavelength; A is a direct current component of the interference spectrum; B is a contrast of the interference spectrum; $\phi_i$ is a phase corresponding to the $i^{th}$ narrowband light wavelength; $\phi_0$ is an initial phase corresponding to the $i^{th}$ narrowband light wavelength; n is a refractive index of air in the cavity of the optical fiber F-P cavity sensor 6; L is the initial cavity length of the optical fiber F-P cavity sensor 6; and $\lambda_i$ is the $i^{th}$ narrowband light wavelength.

In order to satisfy the orthogonal relationship, the following relationship must be satisfied by the four wavelengths $\lambda_1$, $\lambda_2$, $\lambda_3$ and $\lambda_4$:

$$\begin{cases} \phi_1 - \phi_2 = \phi_2 - \phi_3 = \phi_3 - \phi_4 = \frac{\pi}{2} + k\pi \\ \Delta\lambda = \lambda_2 - \lambda_1 = \lambda_3 - \lambda_2 = \lambda_4 - \lambda_3 \approx \frac{\lambda_2^2}{8nL}(2k+1) \end{cases},$$

where k is an integer; $\lambda_1$, $\lambda_2$, $\lambda_3$ and $\lambda_4$ are the wavelengths of the four beams of narrowband light of different wavelengths, respectively; $1, 02, 03 and 04 are the phases corresponding to the wavelengths of the four beams of narrowband light of different wavelengths; L represents the initial cavity length of the optical fiber F-P cavity sensor 6; n is a refractive index of air in the cavity of the optical fiber F-P cavity sensor 6; and $\Delta\lambda$ is a difference between wavelengths of adjacent narrowband light. The required four output wavelengths are determined according to the above conditions.

The formula (i.e., $$\frac{\lambda_2^2}{8nL}(2k+1))$$

that AX satisfies may be calculated according to the formulas $$\phi_1 - \phi_2 = \phi_2 - \phi_3 = \phi_3 - \phi_4 = \frac{\pi}{2} + k\pi \text{ and } \phi_i = \frac{4n\pi}{\lambda_i}L,$$

and it can be understood that the wavelength relationship may be obtained through the phase relationship, that is, when one wavelength $\lambda_2$ is selected (the wavelength two is selected in this embodiment), the other wavelengths $\lambda_1$, $\lambda_3$ and $\lambda_4$ may be calculated according to the formula $$\frac{\lambda_2^2}{8nL}(2k+1).$$

The real-time cavity length of the optical fiber F-P cavity sensor 6 is calculated according to the light intensity data $I_1$, $I_2$, $I_3$, and $I_4$ corresponding to the four wavelengths $\lambda_1$, $\lambda_2$, $\lambda_3$ and $\lambda_4$:

$$\begin{cases} \phi_i = \tan^{-1}\left[\frac{I_4 - I_2}{I_1 - I_3}\right] \pm m\pi \\ L_d = \frac{\lambda_i \phi_i}{4n\pi} \\ L_d = L + \Delta L \end{cases},$$

where i=1, 2, 3, 4; $\phi_i$ is a phase corresponding to an $i^{th}$ narrowband optical wavelength; $\lambda_i$ is the $i^{th}$ narrowband optical wavelength; $I_1$, $I_2$, $I_3$, and $I_4$ are the light intensities corresponding to the wavelengths of the four beams of narrowband light of different wavelengths; m is an integer; n is a refractive index of air in the cavity of the optical fiber F-P cavity sensor; $L_d$ is the real-time cavity length of the optical fiber F-P cavity sensor; L represents the initial cavity length of the optical fiber F-P cavity sensor; and $\Delta L$ is the cavity length change amount of the optical fiber F-P cavity sensor.

The above-described technical schemes of the present application have the following advantages over the related art.

Compared with the conventional single-wavelength demodulation, dual-wavelength demodulation and three-wavelength demodulation, the dynamic range of the adjustable cavity length in the present application is larger. In the present application, the flat ASE broadband light source and the dense wavelength division multiplexer are adopted to replace four independent narrowband laser light sources and optical filters, the matching of the optical filters is not required, so that the system cost and the technical difficulty are greatly reduced. In the present application, the optical fiber F-P cavity sensor can be put into practical use.

What is claimed is:

1. A phase quadrature four-wavelength demodulation system of an optical fiber F-P cavity sensor, comprising a flat amplified spontaneous emission (ASE) broadband light source, an optical fiber circulator, a dense wavelength division multiplexer, a photoelectric detector, and a data acquisition processing unit, wherein the flat ASE broadband light source is connected to the optical fiber circulator, the optical fiber circulator is connected to the dense wavelength division multiplexer, the dense wavelength division multiplexer is connected to the photoelectric detector, and the photoelectric detector is connected to the data acquisition processing unit; and the optical fiber circulator is configured to transmit an optical signal, wherein the optical signal from the flat ASE broadband light source enters the optical fiber F-P cavity sensor via the optical fiber circulator; the optical fiber F-P cavity sensor is configured to generate reflected light, wherein the reflected light generated by the optical fiber F-P cavity sensor is input to the dense wavelength division multiplexer via the optical fiber circulator; the dense wavelength division multiplexer is configured to decompose the received reflected light into four beams of narrowband light of different wavelengths and input the four beams of narrowband light of different wavelengths to the photoelectric detector; the photoelectric detector is configured to perform a photoelectric conversion on the four beams of narrowband light of different wavelengths and input the photoelectrically converted four beams of narrowband light of different wavelengths to the data acquisition processing unit; and the data acquisition processing unit is configured to demodulate the photoelectrically converted four beams of narrowband light of different wavelengths to obtain a cavity length change amount of the optical fiber F-P cavity sensor, wherein the cavity length change amount is used for reflecting a change of to-be-measured external environment;

wherein a formula of the cavity length change amount of the optical fiber F-P cavity sensor is as follows:

$$\begin{cases} \phi_i = \tan^{-1}\left[\dfrac{I_4 - I_2}{I_1 - I_3}\right] \pm m\pi \\ L_d = \dfrac{\lambda_i \phi_i}{4n\pi} \\ L_d = L + \Delta L \end{cases},$$

wherein i=1, 2, 3, 4; $\phi_i$ is a phase corresponding to an $i^{th}$ narrowband optical wavelength; $\lambda_i$ is the $i^{th}$ narrowband optical wavelength; $I_1$, $I_2$, $I_3$, and $I_4$ are light intensities corresponding to wavelengths of the four beams of narrowband light of different wavelengths, respectively; m is an integer; n is a refractive index of air in a cavity of the optical fiber F-P cavity sensor; $L_d$ is a real-time cavity length of the optical fiber F-P cavity sensor; L represents an initial cavity length of the optical fiber F-P cavity sensor; and $\Delta L$ is the cavity length change amount of the optical fiber F-P cavity sensor.

2. The phase quadrature four-wavelength demodulation system of claim 1, wherein the flat ASE broadband light source is set to be an amplified spontaneous emission light source using a C-band optical fiber.

3. The phase quadrature four-wavelength demodulation system of claim 1, wherein the photoelectric detector is a direct current coupled photoelectric detector having an optical fiber input interface.

4. The phase quadrature four-wavelength demodulation system of claim 1, wherein the photoelectric detector is configured to output four paths of voltage having a same amplitude after the photoelectric detector performs the photoelectric conversion on the four beams of narrowband light of different wavelengths.

5. A phase quadrature four-wavelength demodulation method of an optical fiber F-P cavity sensor, wherein a change of to-be-measured external environment is detected by using a phase quadrature four-wavelength demodulation system of an optical fiber F-P cavity sensor, wherein the phase quadrature four-wavelength demodulation system comprises a flat amplified spontaneous emission (ASE) broadband light source, an optical fiber circulator, a dense wavelength division multiplexer, a photoelectric detector, and a data acquisition processing unit, wherein the flat ASE broadband light source is connected to the optical fiber circulator, the optical fiber circulator is connected to the dense wavelength division multiplexer, the dense wavelength division multiplexer is connected to the photoelectric detector, and the photoelectric detector is connected to the data acquisition processing unit; and the optical fiber circulator is configured to transmit an optical signal, wherein the optical signal from the flat ASE broadband light source enters the optical fiber F-P cavity sensor via the optical fiber circulator; the optical fiber F-P cavity sensor is configured to generate reflected light, wherein the reflected light generated by the optical fiber F-P cavity sensor is input to the dense wavelength division multiplexer via the optical fiber circulator; the dense wavelength division multiplexer is configured to decompose the received reflected light into four beams of narrowband light of different wavelengths and input the four beams of narrowband light of different wavelengths to the photoelectric detector; the photoelectric detector is configured to perform a photoelectric conversion on the four beams of narrowband light of different wavelengths and input the photoelectrically converted four beams of narrowband light of different wavelengths to the data acquisition processing unit; and the data acquisition processing unit is configured to demodulate the photoelectrically converted four beams of narrowband light of different wavelengths to obtain a cavity length change amount of the optical fiber F-P cavity sensor, wherein the cavity length change amount is used for reflecting a change of to-be-measured external environment; and the method comprises:
acquiring an interference spectrum of the optical fiber F-P cavity sensor;
calculating an initial cavity length L of the optical fiber F-P cavity sensor according to the interference spectrum;
in a case where a light source enters the optical fiber F-P cavity sensor and the optical fiber F-P cavity sensor generates reflected light, decomposing the reflected light into four beams of narrowband light, and performing a photoelectric conversion on the four beams of narrowband light to determine wavelengths of the photoelectrically converted four beams of narrowband light;
calculating phases corresponding to the wavelengths of the four beams of narrowband light according to the initial cavity length L of the optical fiber F-P cavity sensor and the wavelengths of the photoelectrically converted four beams of narrowband light;
calculating light intensities corresponding to the wavelengths of the four beams of narrowband light according to the phases corresponding to the wavelengths of the four beams of narrowband light; and
calculating the cavity length change amount of the optical fiber F-P cavity sensor according to the light intensities corresponding to the wavelengths of the four beams of narrowband light;

wherein a formula of the cavity length change amount of the optical fiber F-P cavity sensor is as follows:

$$\begin{cases} \phi_i = \tan^{-1}\left[\dfrac{I_4 - I_2}{I_1 - I_3}\right] \pm m\pi \\ L_d = \dfrac{\lambda_i \phi_i}{4n\pi} \\ L_d = L + \Delta L \end{cases}$$

wherein i=1, 2, 3, 4; $\phi_i$ is a phase corresponding to an $i^{th}$ narrowband optical wavelength; $\lambda_i$ is the it narrowband optical wavelength; $I_1$, $I_2$, $I_3$, and $I_4$ are light intensities corresponding to wavelengths of the four beams of narrowband light of different wavelengths, respectively; m is an integer; n is a refractive index of air in a cavity of the optical fiber F-P cavity sensor; $L_d$ is a real-time cavity length of the optical fiber F-P cavity sensor; L represents an initial cavity length of the optical fiber F-P cavity sensor; and $\Delta L$ is the cavity length change amount of the optical fiber F-P cavity sensor.

6. The phase quadrature four-wavelength demodulation method of claim 5, wherein a formula for calculating the initial cavity length L of the optical fiber F-P cavity sensor according to the interference spectrum is as follows:

$$\frac{4n\pi L}{\lambda_x} - \frac{4n\pi L}{\lambda_y} = 2\pi,$$

wherein n is a refractive index of air in a cavity of the optical fiber F-P cavity sensor; and $\lambda_x$ and $\lambda_y$ are center wavelengths corresponding to adjacent peaks in the interference spectrum of the optical fiber F-P cavity sensor.

7. The phase quadrature four-wavelength demodulation method of claim 5, wherein a formula for determining the wavelengths of the photoelectrically converted four beams of narrowband light is as follows:

$$\begin{cases} \phi_1 - \phi_2 = \phi_2 - \phi_3 = \phi_3 - \phi_4 = \dfrac{\pi}{2} + k\pi \\ \Delta\lambda = \lambda_2 - \lambda_1 = \lambda_3 - \lambda_2 = \lambda_4 - \lambda_3 \approx \dfrac{\lambda_2^2}{8nL}(2k+1) \end{cases},$$

wherein k is an integer; $\lambda_1$, $\lambda_2$, $\lambda_3$ and $\lambda_4$ are the wavelengths of the four beams of narrowband light of different wavelengths, respectively; $\phi_1$, $\phi_2$, $\phi_3$, and $\phi_4$ are the phases corresponding to the wavelengths of the four beams of narrowband light of different wavelengths; n is a refractive index of air in a cavity of the optical fiber F-P cavity sensor; and $\Delta\lambda$ is a difference between wavelengths of adjacent narrowband light.

8. The phase quadrature four-wavelength demodulation method of claim 5, wherein a formula for calculating the light intensities corresponding to the wavelengths of the four beams of narrowband light according to the phases corresponding to the wavelengths of the four beams of narrowband light is as follows:

$$\begin{cases} I_i = A + B\cos(\phi_i + \phi_0) \\ \phi_i = \dfrac{4n\pi}{\lambda_i} L \end{cases},$$

wherein i=1, 2, 3, 4; $I_i$ is a light intensity corresponding to an $i^{th}$ narrowband light wavelength; A is a direct current component of the interference spectrum; B is a contrast of the interference spectrum; $\phi_i$ is a phase corresponding to the $i^{th}$ narrowband light wavelength; $\phi_0$ is an initial phase corresponding to the $i^{th}$ narrowband light wavelength; n is a refractive index of air in a cavity of the optical fiber F-P cavity sensor; and $\lambda_i$ is the $i^{th}$ narrowband light wavelength.

9. The phase quadrature four-wavelength demodulation method of claim 5, wherein a formula of the cavity length change amount of the optical fiber F-P cavity sensor is as follows:

$$\begin{cases} \phi_i = \tan^{-1}\left[\dfrac{I_4 - I_2}{I_1 - I_3}\right] \pm m\pi \\ L_d = \dfrac{\lambda_i \phi_i}{4n\pi} \\ L_d = L + \Delta L \end{cases},$$

wherein i=1, 2, 3, 4; $\phi_i$ is a phase corresponding to an $i^{th}$ narrowband optical wavelength; $\lambda_i$ is the $i^{th}$ narrowband optical wavelength; $I_1$, $I_2$, $I_3$, and $I_4$ are light intensities corresponding to wavelengths of the four beams of narrowband light of different wavelengths, respectively; m is an integer; n is a refractive index of air in a cavity of the optical fiber F-P cavity sensor; $L_d$ is a real-time cavity length of the optical fiber F-P cavity sensor; and $\Delta L$ is the cavity length change amount of the optical fiber F-P cavity sensor.

10. The phase quadrature four-wavelength demodulation method of claim 5, wherein the flat ASE broadband light source is an amplified spontaneous emission light source using a C-band optical fiber.

11. The phase quadrature four-wavelength demodulation method of claim 5, wherein the photoelectric detector is a direct current coupled photoelectric detector having an optical fiber input interface.

12. The phase quadrature four-wavelength demodulation method of claim 5, wherein the photoelectric detector is configured to output four paths of voltage having a same amplitude after the photoelectric detector performs the photoelectric conversion on the four beams of narrowband light of different wavelengths.

\* \* \* \* \*